UNITED STATES PATENT OFFICE.

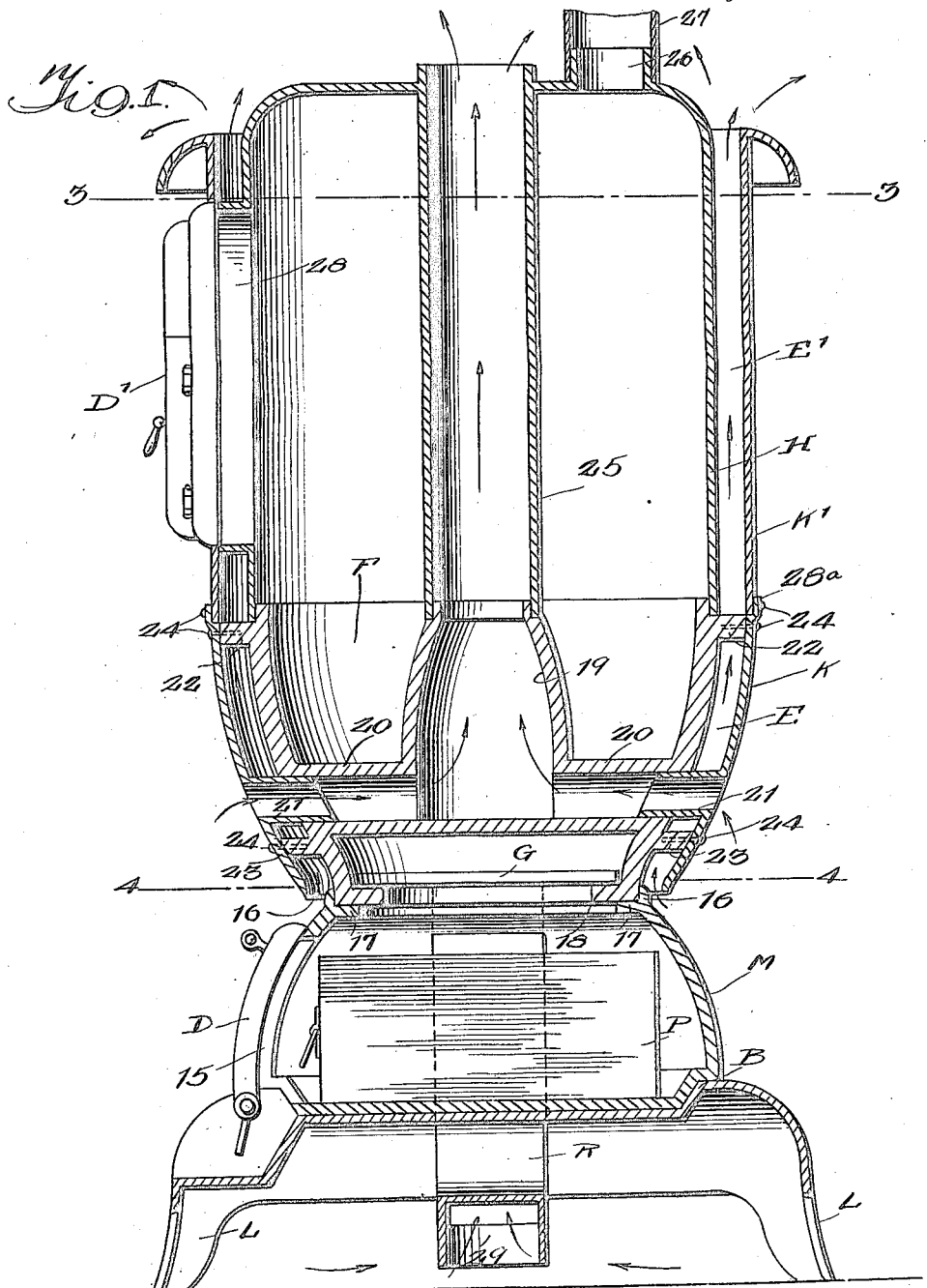

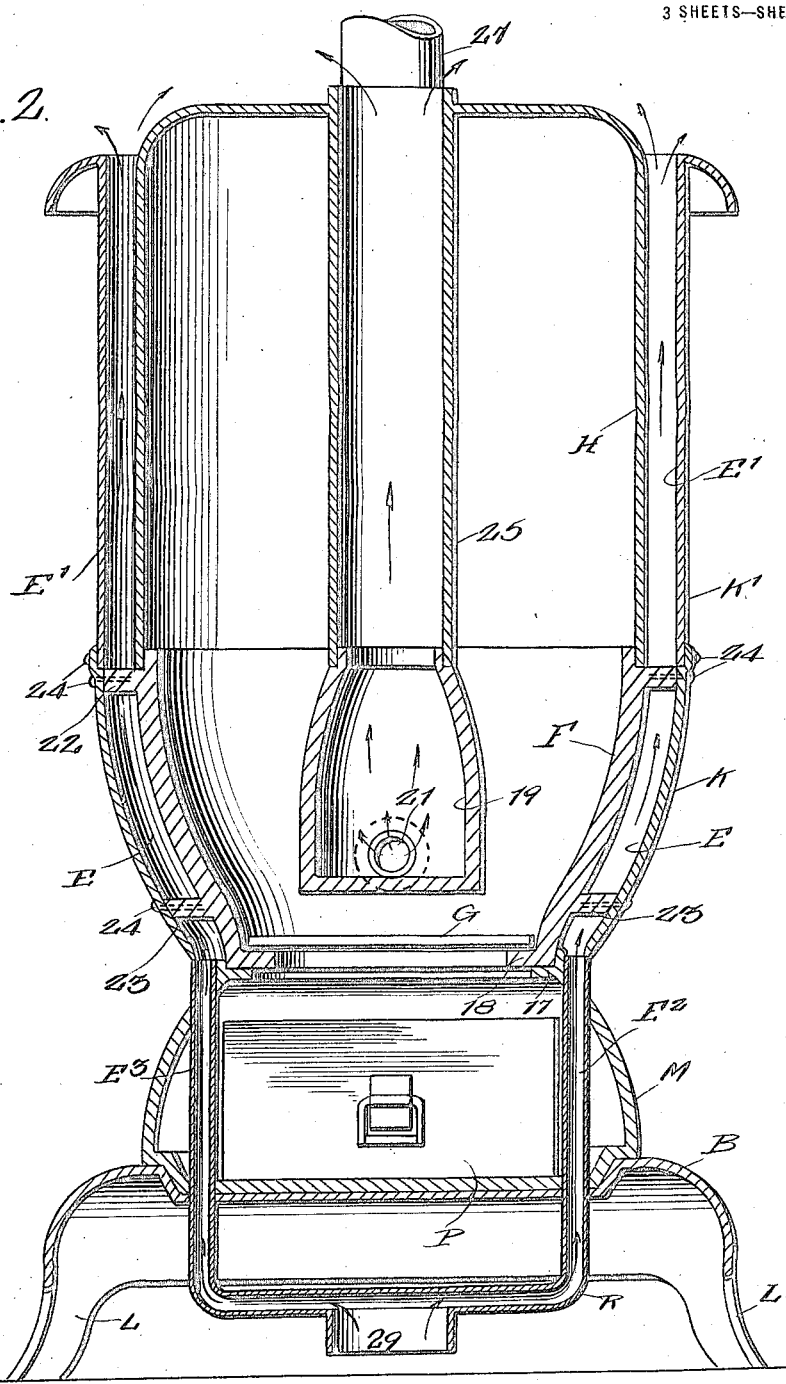

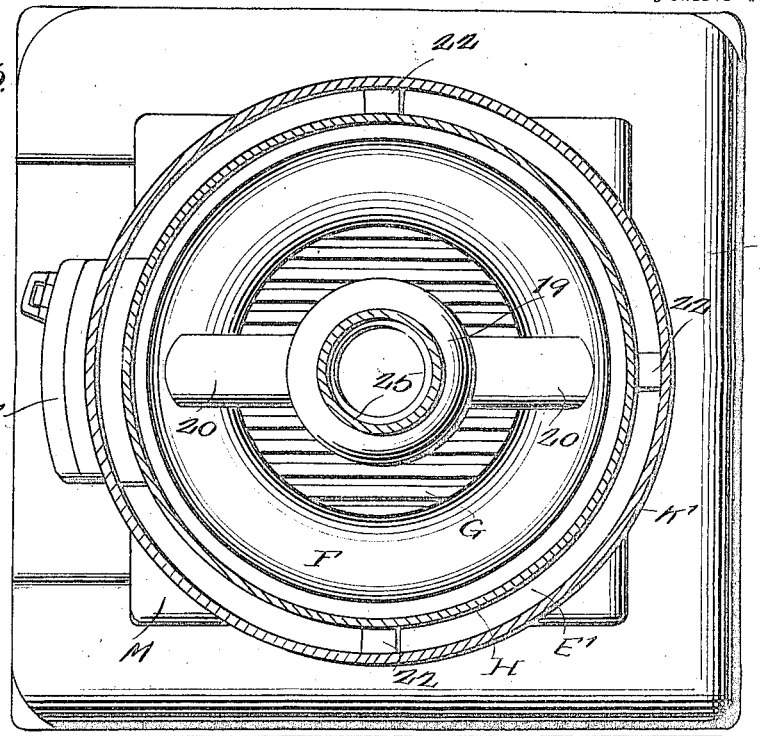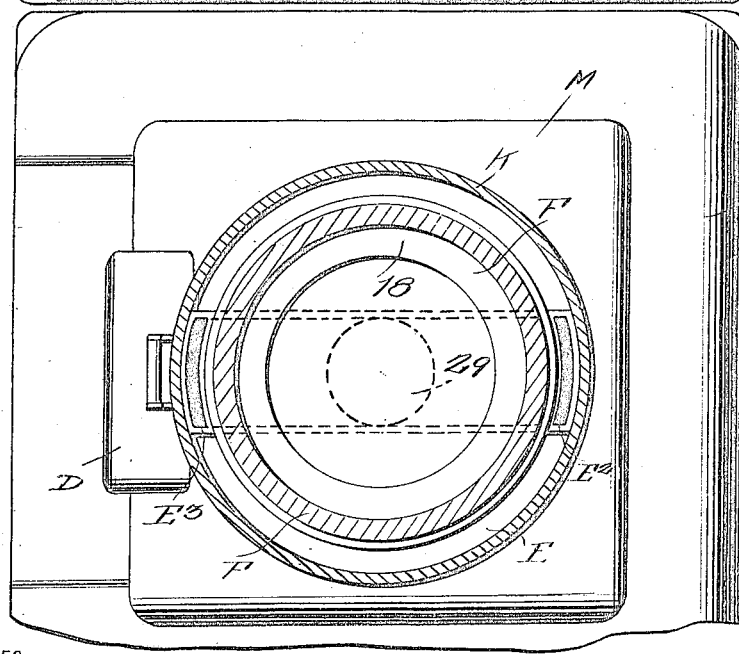

CHARLES A. BURRIDGE, OF ST. JOHNS, MICHIGAN.

HEATING STOVE.

1,403,146.  Specification of Letters Patent.  Patented Jan. 10, 1922.

Application filed February 28, 1921. Serial No. 448,523.

*To all whom it may concern:*

Be it known that I, CHARLES A. BURRIDGE, a citizen of the United States, and a resident of St. Johns, in the county of Clinton and State of Michigan, have invented certain new and useful Improvements in Heating Stoves, of which the following is a specification.

My invention relates to heating stoves, and the purpose of my invention is the provision of a heating stove formed with a plurality of flues so arranged as to provide a circulation of air both interiorly and exteriorly of the stove and from different strata of air whereby, full and complete radiation and circulation is effected and the heating of all strata of air within a room.

I will describe one form of stove embodying my invention and will then point out the novel features thereof in claims.

In the accompanying drawings:

Figure 1 is a view showing in vertical section one form of stove embodying my invention.

Figure 2 is a vertical sectional view taken at right angles to the section of Figure 1.

Figures 3 and 4 are horizontal sectional views taken on the lines 3—3 and 4—4, respectively, of Figure 1.

Similar reference characters refer to similar parts in each of the several views.

Referring specifically to the drawings, my invention in its present embodiment comprises a base B supported in elevated position by means of legs L formed integral with the base. Supported upon the base B is a bowl shaped member M which constitutes an ash-pit in which an ash-pan P is adapted to repose and to be removed and inserted through an opening 15 controlled by a door D. As shown in Figures 1 and 2, the upper end of the member M is provided with an annular flange 16 and an annular shoulder 17 which form supporting means for a bowl shaped hollow body F that constitutes a fire box. The body F is formed at its lower end with an annular lip 18 which reposes on the shoulder 17, this lip also serving to support a conventional form of grate G. Centrally of the body F, an air flue 19 is formed with its lower end communicating with two radially extending pipes 20 which communicate at their outer ends with short pipe sections 21 formed integral with a casing K that surrounds the body F but is maintained in spaced concentric relation thereto by means of radial projections 22 and 23 formed on the body F. Securing members 24 extend through the casing K and into the projections 22 and 23 in the manner shown in Figures 1 and 2 so that the casing forms an integral part of the body F.

Supported on the body F is a heating drum H having its upper end partly closed while its lower end is open and in communication with the fire box. Centrally or axially of the drum H, a pipe 25 is formed which has its lower end embracing the upper end of the body 19 formed in a manner to communicate with the air flue, the upper end of the pipe communicating with atmosphere or with a second pipe (not shown) for delivering the heat to some remote point. The products of combustion of the fuel contained in the fire box F leaves the drum H through an opening 26 which is in communication with a pipe 27. The drum H is provided with a door D' controlling an opening 28 through which latter fuel is introduced into the fire box, as will be understood.

Arranged concentrically of the drum H and supported upon the casing K is a second casing K', the upper edge of the casing K being provided with an annular lip $28^a$ carrying fastening members 24 for securing the casing K' in spaced relation to the drum. As previously described, the casing K is also disposed concentric of the body F so that the two casings K and K' cooperate with the body F and the drum H to provide annular flues designated at E and E', respectively. The lower end of the flue E is in communication with the atmosphere, while its upper end communicates with the lower end of the flue E' so it will be seen that an air passage is provided which completely surrounds both the fire box and heating drum to permit of circulation of air over the entire surface of these members.

As illustrated to advantage in Figure 2, the lower end of the flue E is also in communication with flues $E^2$ and $E^3$ having a common entrance end 29 disposed below the base B. The flues $E^2$ and $E^3$ are formed by a substantially U-shaped pipe R which is provided at its horizontal portion with a flanged opening constituting the entrance end 29. In the application of the pipe R to the member M, suitable openings are formed in the bottom and sides of the member to permit of the association of the upper ends of the vertical portions of the pipe with the lower end of the flue E.

In the operation of the stove, the burning fuel within the fire box F effects a heating of the walls of the fire box and the heating drum which naturally creates a draft upwardly of the flues E and E', with cool air entering the lower end of the flue E and cold air entering the entrance 29 and passing upwardly of the flues $E^2$ and $E^3$ into the flue E. Simultaneously with this action, a draft is created upwardly of the flue 19, cool air entering the flue 19 through the pipes 20 and 21 and thence passing upwardly to and through the pipe 25. By virtue of the several drafts created through the flues and pipes, it will be manifest that practically the entire stove is constantly supplied with fresh air so that a full and complete radiation and circulation is effected both interiorly and exteriorly of the stove. This naturally materially increases the heating efficiency of a given quantity of fuel and renders the operation of the various drafts entirely automatic. Because of the disposition of the pipe sections 21, the lower end of the flue E, and the entrance end 29 of the flues $E^2$ and $E^3$, different strata of air are caused to circulate over the surface of the stove so that a rapid and uniform heating of any inclosure into which the stove is placed, is obtained. It is to be understood that a pipe may be connected to the flanged opening 29 for the purpose of supplying fresh air to the flues $E^2$ and $E^3$ from a point exteriorly of the inclosure in which the stove is placed.

My invention is of extremely simple, durable and efficient construction, with the elements constituting the several flues so associated with each other as to permit a detachment thereof for purposes of substitution or cleaning, the pipe R constituting the flues $E^2$ and $E^3$ being so associated with the ash-pit as to permit of the ready removal and application of the ash-pan to and from the ash-pit without necessitating the detachment of the pipe or disassociation of any of the adjacent parts of the stove.

Although I have herein shown and described only one form of stove embodying my invention, it is to be understood that various changes and modifications may be made herein without departing from the spirit of the invention or the spirit and scope of the appended claims.

What I claim is:

1. A stove comprising, a fire box, an air flue centrally of the fire box, pipes extending radially from the air flue and communicating with the atmosphere at the sides of the fire box, a heating drum, and a pipe within the heating drum and communicating with said air flue, and a casing arranged concentrically of the heating drum and fire box and having its upper and lower ends open to provide annular air flues.

2. A stove comprising, a fire box, an air flue centrally of the fire box, pipes extending radially from the air flue and communicating with the atmosphere at the sides of the fire box, a heating drum, a pipe within the heating drum and communicating with said air flue, a casing arranged concentrically of the heating drum and fire box and having its upper and lower ends open to provide annular air flues, an ash-pit, and air flues communicating with the first air flues and having their entrance ends disposed below the ash-pit.

3. A stove comprising, a fire box, an air flue centrally of the fire box, pipes extending radially of the fire box and communicating with the air chamber, a casing arranged concentrically of the fire box, pipe sections carried by the casing and communicating with the pipes of the fire box, a heating drum on the fire box, a pipe within the heating drum and communicating with said air flue, and a second casing concentric of the heating drum, said casings cooperating with the fire box and heating drum to provide a circulation flue surrounding the fire box and heating drum and having its lower end open to allow the admission of air thereto.

4. A stove comprising, a fire box, an air flue centrally of the fire box, pipes extending radially of the fire box and communicating with the air flue, a casing arranged concentrically of the fire box, pipe sections carried by the casing and communicating with the pipes of the fire box, a heating drum on the fire box, a pipe within the heating drum and communicating with said air flue, a second casing concentric of the heating drum, said casings cooperating with the fire box and heating drum to provide a circulation flue surrounding the fire box and heating drum and having its lower end open to allow the admission of air thereto, an ash-pit beneath the fire box, and a pipe having its ends in communication with said annular flue and an opening intermediate its ends disposed below the ash-pit for admitting air to the pipe.

CHARLES A. BURRIDGE.